United States Patent [19]

Godbersen

[11] 4,307,857
[45] Dec. 29, 1981

[54] DUCTED FAN UNIT
[76] Inventor: Byron L. Godbersen, 710 Circle Dr., Ida Grove, Iowa
[21] Appl. No.: 77,646
[22] Filed: Sep. 21, 1979
[51] Int. Cl.³ .................. B64D 27/08; A63H 27/02
[52] U.S. Cl. .............................. 244/54; 46/76 A; 415/210
[58] Field of Search .................. 244/13, 15, 16, 54, 244/55, 53 A; 46/76 R, 76 A, 78; 415/210; 248/554, 555, 556, 557

[56] References Cited
U.S. PATENT DOCUMENTS

| 2,154,313 | 4/1939 | McMahan | 415/210 |
| 2,477,637 | 8/1949 | Mercier | 244/15 |
| 2,568,136 | 9/1951 | Weimer | 46/78 X |
| 2,619,302 | 11/1952 | Loedding | 244/15 |
| 2,783,003 | 2/1957 | Ralston et al. | 244/54 |
| 2,925,711 | 2/1960 | Townsend | 244/15 |
| 3,072,365 | 1/1963 | Linscott et al. | |
| 3,796,005 | 3/1974 | Chang et al. | 46/76 A X |
| 3,957,230 | 5/1976 | Boucher et al. | 46/78 X |
| 3,979,087 | 9/1976 | Boris et al. | 244/54 |
| 4,088,285 | 5/1978 | Sogabe et al. | 244/16 |

FOREIGN PATENT DOCUMENTS
499426 2/1920 France ...................... 244/53 A

OTHER PUBLICATIONS
Meyers, "Attention, Manufacturers of Small Engines", American Aircraft Modelers, 7/16/74 (Scozzi Engine).

Primary Examiner—Duane A. Reger
Attorney, Agent, or Firm—Henderson & Sturm

[57] ABSTRACT

A ducted fan unit is installed in a scale model airplane the unit being positioned centrally within the hollowed fuselage, and including an engine, with fan assembled thereto, secured to an aerodynamically sleek mounting bracket, the mounting bracket is secured to a cowl and positions the fan within the forward portion of the cowl, the rearward portion of the cowl includes a flow straightener having radially disposed spokes with curved forward portions to deflect the air flow linearly.

10 Claims, 9 Drawing Figures

U.S. Patent  Dec. 29, 1981  Sheet 1 of 2  4,307,857
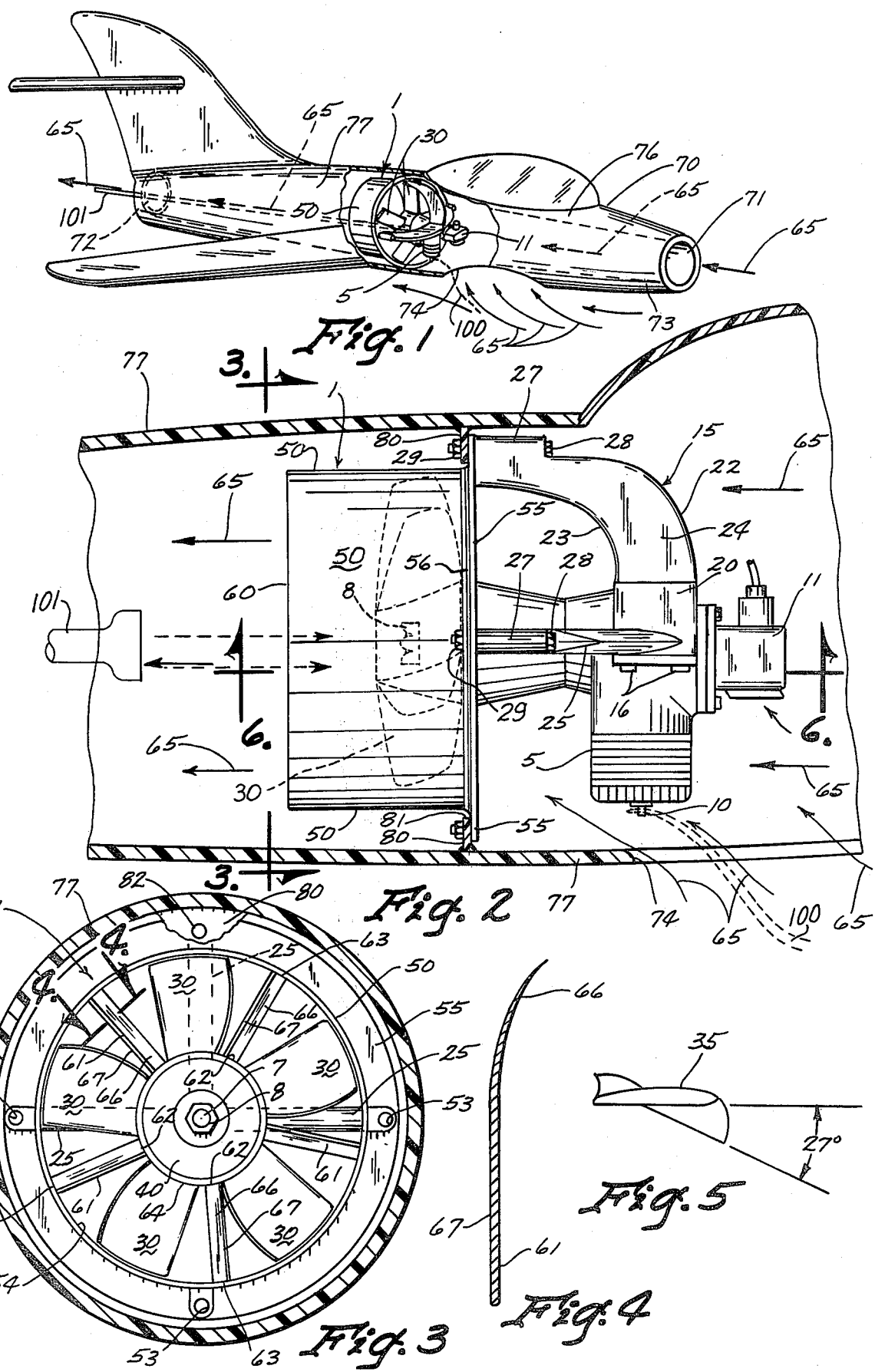

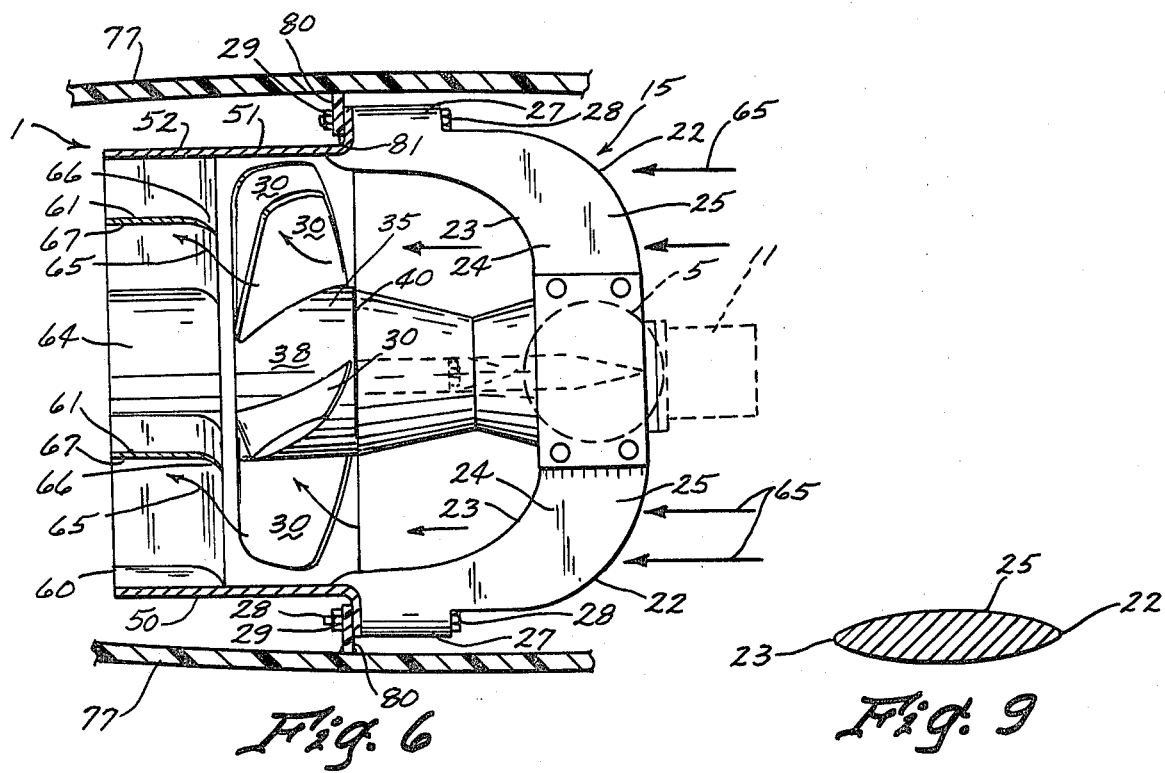
Fig. 6
Fig. 9
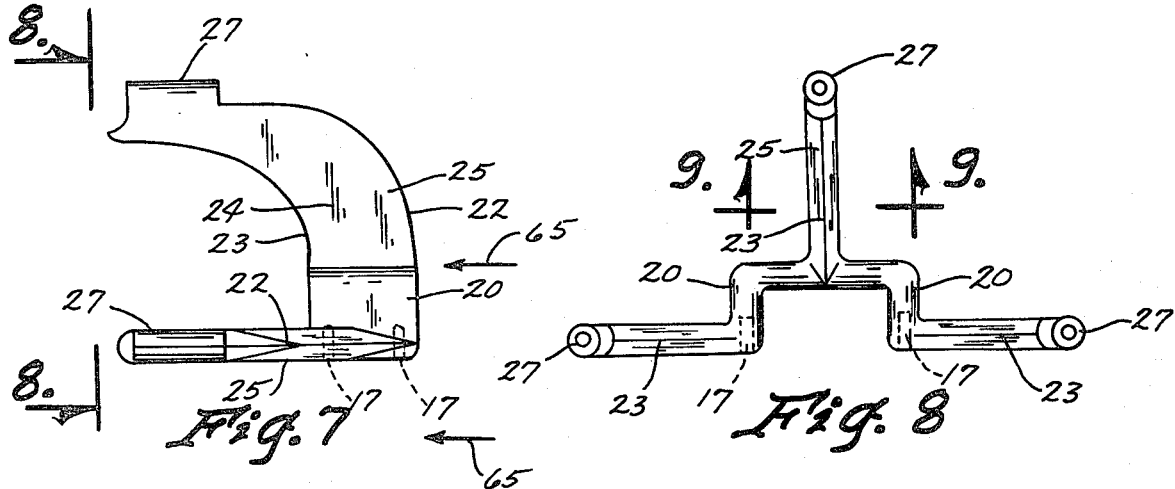
Fig. 7
Fig. 8

DUCTED FAN UNIT

BACKGROUND OF THE INVENTION

The present invention relates generally to fan units for scale model airplanes and specifically to ducted fan units for propelling such airplanes.

The prior art inventions have necessitated the use of high rpm engines (racing engines) which require a high nitro fuel. The ducted fan unit structure of the instant invention permits the use of a smaller 0.60 cubic inch, or "standard 0.60 engine" which burns regular airplane fuel to power the scale model. The 0.60 engine is less expensive, easier to tune, and lasts considerably longer than racing engines presently used with fan units of similar size. The use of a smaller engine is permitted in part, by the employment of a larger fan having a different pitch angle in conjunction with the larger cowl and unit overall. In addition, the mounting of the unit within a smooth surface air tunnel extending throughout the plane has facilitated the use of the smaller engine, as has the aerodynamic design of the engine mount. The combination as a whole achieves greater thrust forces at lower rpms than was possible with the prior art inventions.

The present structure is moreover simpler in operation in that the engine is held in an open space which is easily accessible through an opening in the belly of the fuselage. Furthermore, the engine is more easily started in that the fan is turned by the insertion into the fan hub of an extended rod through an opening provided in the tail. Prior art inventions have required a belt to be wrapped around the fan hub for starting.

SUMMARY OF THE INVENTION

The present invention comprises a ducted fan unit having an engine, with a fan assembled thereto, secured to a mounting bracket which is in turn attached to a cowl element so that the fan is positioned inside of the forward portion of the cowl; the rearward portion of the cowl including a flow straightening element. The engine is positioned in front of the fan and not behind, as opposed to the conventional tractor type; thus, the engine as employed is a "pusher" and pushes, rather than pulls, air through the straighteners which is more efficient. This unit is installed into the fuselage of a scale model airplane. Such models typically are around 56 inches or so in length and approximately 10 lbs. in weight. The fuselage of the plane has been hollowed so that a smooth air tunnel extends from a nose opening to a tail opening, with an additional opening in the belly of the fuselage. The unit is mounted to a bracket about one foot rearward of the belly opening and extends across the air tunnel. In flight, air flows are supplied into the fan through the nose and belly openings. The fan converts this intake air flow into a spiraling air flow which impinges upon the web type spokes of the flow straightener. The spokes have curved forward portions which redirect the flow rearward, translating the angular velocity of the spiraling flow into linear velocity. The flow straightener, thus, enhances thrust as the straightened flow is expelled through the tail opening of the fuselage. It is observed, further, that the unit, except for the engine, is of a lightweight injection molded 40% glass filled nylon construction which further enhances its aerodynamic characteristics.

The present invention thus achieves greater thrust at lower rpms with a smaller engine by employing a larger and modified fan and cowl unit which is of a lightweight construction and includes an aerodynamically sleek mounting bracket; the unit being secured centrally within the hollowed fuselage.

It is therefore an object of the present invention to provide a ducted fan unit for propelling a scale model airplane which utilizes a 0.60 cubic inch engine such as a SCHNUERLE which burns regular Glow-Plug airplane fuel.

It is a further object to provide a ducted fan unit which is secured centrally within a hollowed fuselage.

Still another object is to provide an engine mounting bracket positioned in front of the fan which is aerodynamically sleek to minimize air flow restrictions.

A still further object is to provide a ducted fan unit wherein the engine is easy and safe to operate.

These and other objects, advantages and novel features of the invention will become apparent from the following detailed description of the invention when considered in conjunction with the accompanying drawings.

BRIEF DESCRIPTION OF THE DRAWINGS

FIG. 1 is a perspective view of the ducted fan unit installed in the fuselage, with portions of the fuselage broken away to reveal the unit.

FIG. 2 is a elevational side view of the ducted fan unit installed in the fuselage, with the fuselage portion shown in cross-section.

FIG. 3 is an elevational end view of the ducted fan unit, taken along line 3—3 of FIG. 2, with the fuselage shown in cross-section, the major portion of the mounting bracket broken away, and the securing nuts and bolts removed.

FIG. 4 is a cross-sectional view of a typical spoke of the flow straightener taken along line 4—4 of FIG. 3.

FIG. 5 is an end view of a typical blade of the fan.

FIG. 6 is a partial cross-sectional plan view taken generally along line 6—6 in FIG. 2, with one curved arms, the engine, and the carburetor shown in dotted lines.

FIG. 7 is a side elevational view of the engine mount.

FIG. 8 is an end elevational view of the engine mount taken along line 8—8 of FIG. 7.

FIG. 9 is a cross-sectional view of a typical curved arm of the engine mount taken along line 9—9 of FIG. 8.

DESCRIPTION OF THE PREFERRED EMBODIMENT

The preferred embodiment of the present invention is best seen in FIG. 6 where it is generally indicated by the numeral 1. The ducted fan unit 1 is comprised essentially of a fan 35 assembled to an engine 5 which is mounted to an engine mount 15 which in turn is secured to a cowl 50. The cowl 50 includes flow strightener 60.

The engine 5 employed with the invention is a standard 0.60 cubic inch engine. Fan 35 is secured to engine 5 by means of a fan bolt 7 and nut 8. Fan 35 has five blades 30, a first hollow cylindrical hub 38, and a base 40 as shown in FIG. 6. The blades 30 are radially disposed from first cylindrical hub 38, and first hub 38 is disposed perpendicularily from base 40. Fan 35 is somewhat larger in diameter than fans employed with other ducted fan units for scale model airplanes. The applicant by employing a 6¼ inch diameter fan having a 27° pitch (see FIG. 5) in combination with the other elements of the invention (later described) has been able to achieve 8½ lbs. of static thrust which is suitable to power a 8½ lb. scale airplane. Previous ducted fans have required high rpm engines to achieve sufficient thrust to satisfactorily fly scale planes. Note, within the teachings of the present invention, however, fans with somewhat varied diameters and having a modified pitch angle could be utilized with the unit, and thus, such designs are intended to be included here and would be obvious variations of the fan element disclosed.

Engine 5 is mounted to engine mount 15 by means of bolts 16 which are threaded into threaded holes 17. See FIGS. 2, 6 and 7. The engine 5 is secured within a U-shaped engine mounting portion 20. Engine mount 15 is a three-point bracket with three curved arms 25. The curved arms 25 originate at the U-shaped portion 20 and terminate in securing bolt receiving collars 27. The engine mount 15 is secured to the lip 55 of cowl 50 by means of bolts 28 which are inserted through the collars 27 and into first mating apertures 53. The apertures 53 are disposed at 90° intervals about 360° circular lip 55. Nuts 29 secure the bolts 28. Note that inasmuch as the three point bracket 15 includes only three curved arms 25, one of the first mating apertures 53 is not used in securing engine mount 15 to cowl 50.

FIG. 1 illustrates the orientation of the present ducted fan unit structure 1 in flight. The direction of air flow through the unit 1 is indicated by arrows 65. This air flow direction is also indicated in FIG. 2. Air flowing into the fan 35 will have to flow past engine mount 15. For this reason, engine mount 15 has been designed to be aerodynamically sleek to minimize any restriction to air flowing into fan 35. With reference to FIG. 9 it is accordingly, observed that each of the curved arms 25 has curved forward and rearward edges 22 and 23, respectively, and broad sides 24 which are generally disposed in a direction parallel to the direction of air flow 65.

In regard to engine mount 15 it is further noted that the three-point mounting bracket 15 secures the engine 5 such that fan 35 is inserted fully into the forward portion 51 of the cowl 50. See FIG. 6.

The cowl 50 is substantially cylindrical with only a slight taper to permit proper release from an injection mold in manufacturing. Cowl 50 has a lip 55 disposed to encircle its forward edge 56, a forward portion 51, and a rearward portion 52. Secured within rearward portion 52 is the flow straightener 60. Flow straightener 60 has curved web-like spokes 61 and a second hollow cylindrical hub 64. A spoke 61 is shown in cross-section in FIG. 4. The spokes 61 are radially disposed from second cylindrical hub 64, being spaced at equal angular intervals, and having a first end 62 attached to hub 64, and opposite thereto, a second end 63 secured to the interior wall 54 of the cowl 50. Each spoke 61 has a curved forward portion 66 which serves a purpose best understood with reference to the operation of the unit (later described).

Having thus described the structure of the ducted fan unit 1, it is installed in a scale model airplane 70 in the following way.

Airplane 70 is of the scale type and in this embodiment has a length of 55" and a weight of 8½ lbs. A smooth air tunnel 73 is housed within the plane's fuselage extending from nose opening 71 to tail opening 72. Formed into the belly of the fuselage, in addition, is a belly opening 74. A plywood mounting bracket 80 is fiberglassed within the fuselage approximately 1 foot rearward of belly opening 74, bracket 80 being secured to the walls of smooth air tunnel 73. The mounting bracket 80 has a hole 81 provided therein to receive the cowl 50 of the assembled unit 1. The cowl 50 is inserted through the hole 81 until the lip 55 makes contact with bracket 80. Bracket 80 has four second mating apertures 82 which are spaced around the 360° hole 81 at 90° intervals. These second apertures correspond to the first apertures 53 disposed on lip 55 of the cowl 50.

To assemble the unit 1 into the fuselage, bolts 28 are inserted through the securing bolt receiving collars 27 of the three curved arms 25, and then through the first mating apertures 53 of cowl 50, and finally, through the second mating apertures 82 of the mounting bracket 80. Nuts 29 are tightened on the bolts 28 to secure the unit 1 to the mounting bracket 80. Thus secured in the fuselage, the unit 1 is positioned across smooth air tunnel 73. Note that ducted fan unit 1 is installed in the plane with the engine 5 pointed downwardly towards belly opening 74. This downward orientation of engine 5 permits access to glow plug 10 and carburetor 11 through belly opening 74 to allow for easy starting as will next be described.

In operation the unit 1 propels the plane 70 in the following way.

To start engine 5, an electrical wire 100 is first connected from a battery to glow plug 10 through belly opening 74. Having thus provided a source for an electrical spark, an extended shaft 101 is inserted in sequence through tail opening 72, second cylindrical hub 64, and first cylindrical hub 38 wherein it is secured upon fan nut 8. The shaft 101 is then rotated to manually crank the engine which starts with the aid of an electric spark from the glow plug. With the engine started, the extended shaft 101 is withdrawn through the tail opening 72, and the electrical wire 100 is removed from glow plug 10. Note that with the engine running the fuel mixture can be adjusted at carburetor 11. It is incidentally observed that the above starting procedure is far easier than those for the prior art inventions which have required the use of a belt to be wrapped around the hub. Here also, the blades are covered by cowl 50 which will eliminate many injuries particularly to hands and fingers.

As the fan 35 spins, air is drawn through the nose opening 71 and the belly opening 74. These two air flows comprise an intake air flow which is drawn into the fan 35 from intake region 76 of the smooth air tunnel 73. This intake air flow is converted into a spiraling air flow by fan blades 30. With reference to FIG. 3, the blades 30 rotate in a counter clockwise direction, and therefore, as viewed from the rear the air flow will be spiraling counterclockwise as it leaves fan 35. This spiraling air flow will impinge upon the forward curved portions 66 of the spokes 61. Curved portions 66 deflect the air flow rearwardly in a linear manner along the flat faces 67 of the spokes 61. This deflection translates the angular velocity of the spiraling air flow into linear velocity, and thus, a straightened air flow is expelled from flow straightener 60 into exhaust region 77 of the smooth air tunnel 73. From exhaust region 77, the straightened air flow passes through tail opening 72, and in so doing, a thrust force is created which powers the scale airplane 70. The fan 30 as employed with the present ducted fan unit 1 is therefore of the pusher type fan. Note that smooth air tunnel 73 is covered with a smooth coating to eliminate surface irregularities, and thereby, minimize air drag.

In the present embodiment, cowl 50, flow straightener 60, and the engine mount 15 are all of a light weight construction: Namely, injection molded 40% glass filled nylon.

As has been explained previously, the instant ducted fan unit 1 permits the use of 0.60 cubic inch engine using regular glow plug airplane fuel. Prior to this a high rpm engine using high nitro fuel has been necessary to power a scale airplane. In the preferred embodiment, a 6¼ inch diameter fan with a 27° pitch is utilized in the ducted fan unit to achieve sufficient thrust. It is understood, however, that insubstantial deviations from these specifications could obviously be employed in light of the teachings of the invention to achieve sufficient thrust with the smaller engine: Such would be only obvious modifications of the present structure and are therefore within the scope of the invention.

Having thus disclosed my invention, it is therefore understood that many modifications and variations are possible in light of its teachings, and that, within the scope of the appended claims, the invention may be practiced otherwise than as specifically described.

I claim:

1. In a model airplane, having an engine, a ducted fan unit, comprising:
   a fan means secured to said engine and comprising a plurality of blades radially disposed from a first cylindrical hub said fan means drawing in an intake air flow and discharging a spiraling air flow;
   a cowl means for channeling said intake air flow and said spiraling air flow, said cowl means being cylindrical;
   a means for straightening said spiraling air flow, said flow straightening means being enclosed within a rearward portion of said cowl means and being comprised of a plurality of web shaped spoke members disposed radially about a second hollow cylindrical hub portion, said cylindrical cowl having a horizontal axis, said spoke members being disposed in a first vertical plane, said first vertical plane being perpendicular to said horizontal axis, said cowl having a substantially cylindrical inside surface, each of said spoke members being secured at a first end to said inside surface, and at a second end to said second cylindrical hub; and
   a means for mounting said engine, said mounting means securing said engine so that said fan means is positioned in a forward portion of said cowl means, said mounting means comprising a three-point bracket, said three-point bracket having three curved arms, each of said arms originating at a U-shaped engine mount portion and terminating in a securing bolt receiving collar, each of said securing bolt receiving collars being suitable for receiving a long bolt, each of said long bolts being inserted through one of said receiving collars and through a first mating aperture in a lip portion of said cowl, a nut being threaded on each of said bolts to secure said three-point bracket to said cowl, said engine mount portion securing said engine so that said fan is positioned in said forward portion of said cowl in a second vertical plane perpendicular to said horizontal axis of said cowl, said forward portion of said cowl enclosing said fan so that said spiraling air flow discharged from said fan impinges upon said flow straightening element and is thereby transformed to a straightened air flow by said flow straightening element.

2. The ducted fan unit of claim 1 wherein each of said curved arms of said three-point bracket have a forward edge and a rearward edge and a pair of broad sides, said forward edges and said rearward edges being rounded and said broad sides being disposed substantially parallel to the direction of said intake air flow, said three-point bracket thereby causing only a minimum of restriction to said intake air flow.

3. The ducted fan unit of claim 1 wherein said ducted fan unit is secured within a fuselage of said airplane, said airplane having a nose end and a tail end and including a smooth air tunnel extending from said nose end to said tail end, said smooth air tunnel having a nose opening at said nose end and a tail opening at said tail end, said fuselage having a belly and a belly opening in said belly, said belly opening comprising a third opening in said smooth air tunnel, said ducted fan unit being secured within said smooth air tunnel rearward of said belly opening, a mounting bracket being secured to said smooth air tunnel, said mounting bracket having a circular hole for receiving said cowl and second mating apertures such that said cowl can be inserted through said circular hole and where said lip will abut with said mounting bracket, said second mating apertures aligning with said first mating apertures, and said long bolts being inserted through said securing bolt receiving collars, through said first mating apertures, and then through said second mating apertures, said nuts being threaded upon said bolts to secure said three-point bracket and said cylindrical cowl to said mounting bracket; air flowing through said nose opening to comprise a first air intake flow, air flowing through said belly opening to comprise a second air intake flow, said first air intake flow together with said second air intake flow comprising said air intake flow, said smooth air tunnel having an intake region and an exhaust region, said air intake flow passing through said intake region, and being drawn into said cylindrical cowl by said fan, said air intake flow being converted to said spiraling air flow by said blades of said fan, said spiraling air flow impinging upon said spoke members of said flow straightening means, said spiraling air flow being transformed into said striaghtened air flow passing through said exhaust region of said smooth air tunnel and being discharged through said tail opening, said straightened air flow comprising a thrust force which propels said airplane, said smooth air tunnel being coated with a smooth coating to minimize air drag.

4. The ducted fan unit of claim 1 wherein said ducted fan unit is secured within a fuselage having a belly and a belly opening, and wherein said engine has a glow plug and carburetor, and said three-point bracket positions said engine so that said glow plug and said carburetor point downwardly and are accessible for starting and adjustment through said belly opening.

5. The ducted fan unit of claim 1 wherein said flow straightening means is comprised of five spoke members, said spokes being disposed radially at 72° intervals about said second cylindrical hub, said spokes having a curved forward portion for deflecting said spiraling air flow in a rearward direction.

6. The ducted fan unit of claim 1 wherein said fan has five blades, said fan having a diameter greater than six inches, and said blades having a pitch of 27°.

7. The ducted fan unit of claim 1 wherein said engine is of the SCHNUERLE ported 0.60 cubic inch type.

8. The ducted fan unit of claim 1 wherein said cylindrical cowl and said flow straightening means are of a glass filled nylon construction.

9. In a model airplane having an engine, a ducted fan unit, comprising:
   a fan means for propelling said airplane; said fan means being rigidly secured to said engine for rotation;
   a bracket means for securing said engine in an upwind direction with respect to said fan means;
   a cowl means for channeling an air flow, said cowl means being rigidly secured to said bracket means so that said fan means is positioned within a forward portion of said cowl means, said cowl means also having a rearward portion;
   a flow straightening means for converting a spiraling air flow discharged from said fan means into a straightened air flow, said flow straightening means being rigidly secured within said rearward portion of said cowl means; and
   a mounting means, for securement of said cowl means and said bracket means to an inner surface of a hollowed fuselage of said airplane, said hollowed fuselage having a belly opening, and said mounting means securing said cowl means rearward of said belly opening to provide a continuous airflow to said cowl means through said belly opening, said engine being accessible through said belly opening, wherein said bracket means secures said engine in a downward direction, said engine having a carburetor, and said carburetor being accessible for adjustment through said belly opening.

10. The ducted fan unit of claim 9 wherein said fuselage has a tail opening, and said engine has a glow plug, said glow plug being accessible for the connection of an electrical wire through said belly opening, said fan means having a means for connection to an extended rod, said electrical wire supplying a spark to said engine through said glow plug, and said extended rod being inserted through said tail opening and being secured to said connection means to rotate said fan for starting.

* * * * *